US00RE34210E

United States Patent [19]

Lane et al.

[11] E Patent Number: Re. 34,210

[45] Reissued Date of Patent: Apr. 6, 1993

[54] LINEAR RELEASE ICE MACHINE AND METHOD

[76] Inventors: Robert C. Lane; Joseph M. Lee, both of 2030 Richmond, Houston, Tex. 77098

[21] Appl. No.: 347,430

[22] Filed: May 3, 1989

Related U.S. Patent Documents

Reissue of:

[64] Patent No.: 4,688,386
Issued: Aug. 25, 1987
Appl. No.: 827,083
Filed: Feb. 7, 1986

[51] Int. Cl.[5] ..... F25C 5/06

[52] U.S. Cl. ..... 62/72; 62/347; 62/348; 62/353

[58] Field of Search ..... 62/353, 348, 347, 72

[56] References Cited

U.S. PATENT DOCUMENTS

| | | | |
|---|---|---|---|
| Re. 20,656 | 2/1938 | Geyer | 62/72 |
| 2,616,271 | 11/1952 | Knowles | 62/347 X |
| 2,701,453 | 2/1955 | Henderson | 62/353 |
| 3,144,755 | 8/1964 | Kattis | 62/353 X |
| 3,255,606 | 6/1966 | Hammer | 62/72 X |
| 3,318,106 | 5/1967 | Litman | 62/347 X |
| 3,430,452 | 3/1969 | Dedricks et al. | 62/347 X |
| 3,929,256 | 12/1975 | Solomon | 62/72 X |
| 4,549,408 | 10/1985 | Lee et al. | 62/347 X |
| 4,589,261 | 5/1986 | Ohashi et al. | 62/347 X |
| 4,590,774 | 5/1986 | Povajnuk | 62/347 |

*Primary Examiner*—William E. Wayner

[57] ABSTRACT

An ice maker in which water runs over a vertical evaporator to form ice cubes formed between vertical and horizontally mounted plates. The cubes are released from the evaporator by simultaneously applying a horizontal force to the plates while heating the evaporator.

24 Claims, 1 Drawing Sheet

FIG. 1
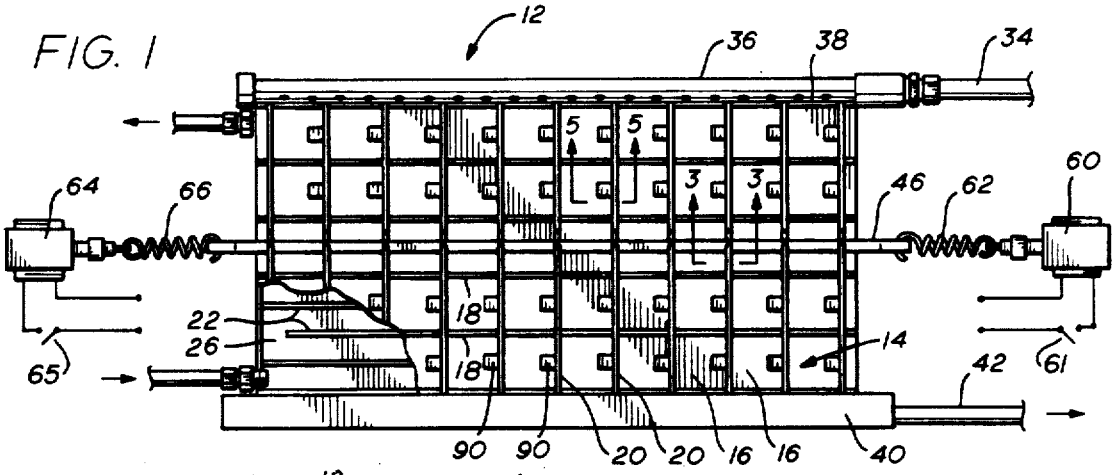
FIG. 2
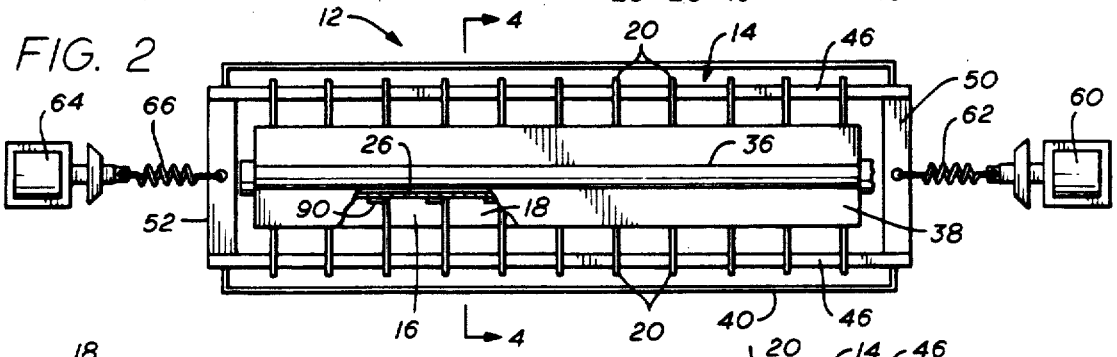
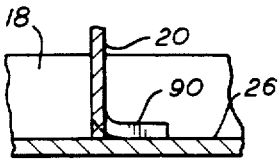
FIG. 5
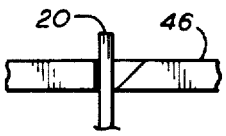
FIG. 3
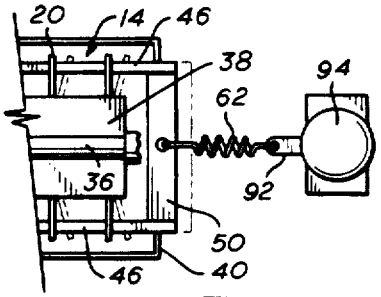
FIG. 7
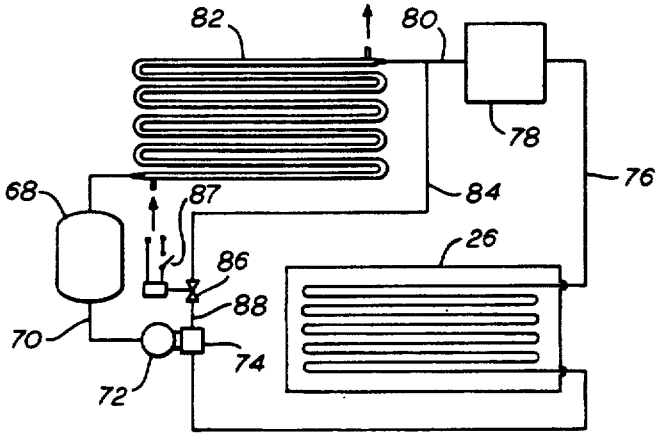
FIG. 6
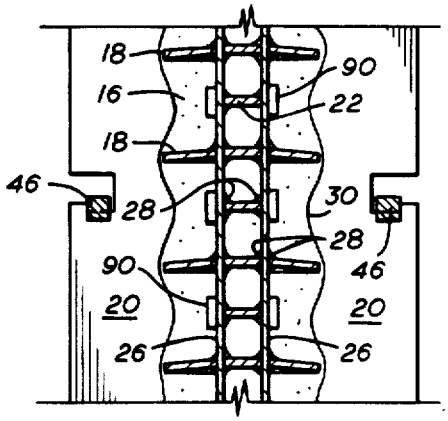
FIG. 4

LINEAR RELEASE ICE MACHINE AND METHOD

Matter enclosed in heavy brackets [ ] appears in the original patent but forms no part of this reissue specification; matter printed in italics indicates the additions made by reissue.

FIELD OF THE INVENTION

This invention generally relates to methods and apparatus for making cubed ice in quantities suitable for restaurants, hotels, motels and the like. More particularly, this invention pertains to a method and apparatus for making cubed ice in quantities significantly greater than provided in the prior art with apparatus of the same size.

This application is co-pending with commonly assigned application Ser. No. 827,083, filed Feb. 7, 1986.

BACKGROUND OF THE INVENTION

The nearest known prior art to the present invention is the method and apparatus disclosed in Lee, et al., U.S. Pat. No. 4,549,408 which has common inventorship with the present invention and is commonly assigned with the present invention. The references cited in U.S. Pat. No. 4,549,408 are of note. Lee, et al. disclose ice maker apparatus including a triple walled stationary evaporator drum disposed with a plurality of equally spaced radially outwardly projecting ridges. Evenly distributed water flow over the drum freezes as a layer of ice on the freezing surface of the drum and the ice is intermittenly removed into broken and sized cubes by a sequentially functioning cutter assembly.

Lee, et al. note that prior art ice makers require the provision of some form of heat to the evaporator drum surface in the removal of ice and that such procedure is energy inefficient since a tremendous amount of energy is expended to freeze, heat, and refreeze the surface upon which the ice is formed. While this statement is generally true, the present invention is in exception in that the mass of material to be heated is very small, the heating cycle is very short, and the transition from freezing, to heating, to freezing, is very rapid, as later shown.

The present invention will produce well shaped "dry" cubes of ice and in quantities much greater than the prior art apparatus of equal size as disclosed in the prior patents.

OBJECTS OF THE INVENTION

The principle object of the present invention is to provide a method and apparatus for producing cubed ice in a freezing evaporator and storage structure much greater than can be provided by the prior art.

Another object of the present invention is to provide a cubed ice making method and apparatus wherein the unit cost for the cubed ice is much less than that of the prior art of comparable size.

Another object of the present invention is to provide a method and apparatus for making cubed ice wherein the ice cubes are well formed, frozen, and maintain a good form and shape when going into storage for use.

Yet another object of the present invention is to provide ice cube making apparatus which is comparatively simple in structure, yet very good functionally, in freezing the ice cubes and removing the frozen cubes for subsequent storage.

SUMMARY OF THE INVENTION

The foregoing and other objects of the present invention are attained by the method of repetitively making discreet blocks of ice which is performed with apparatus having a plurality of adjacently disposed ice freezing pockets formed with a refrigeration evaporator as the base of each pocket of the pockets, horizontally extending and vertically spaced apart evaporator fins as the sides of the pockets, and horizontally moveable vertical plates as the ends of the pockets. A refrigeration apparatus is provided to alternately freeze the refrigeration evaporator of the ice freezing pockets and very quickly and very briefly heat the refrigeration evaporator directly to loosen the ice blocks from the freezing pockets. Apparatus is provided to apply a force to the vertical plates to urge the plates from a first position horizontally toward a second position until the immediate surfaces of the ice blocks are melted and loosened from the freezing pockets. The vertical plates thereon move the ice blocks within the freezing pockets, then are rapidly returned to the first position which ejects the ice blocks completely from the freezing pockets. The heat exchange within each block of the ice blocks is such that the immediate surface of the ice block, which was melted in the ice pocket, refreezes with the heat causing melting being absorbed by the total ice block. The freezing and ejection cycle as described is repetitive and continuous. The refrigerant plates of the evaporator directly form the base of the ice freezing pockets and these plates, along with the sides of the freezing pockets, are the only mass involved for the rapid change in temperature and the brief heating cycle to loosen the ice blocks from the freezer pockets.

BRIEF DESCRIPTION OF THE DRAWING

FIG. 1 is a side elevational view of an ice freeze machine unit of the present invention;

FIG. 2 is a plan view of the freezer unit of FIG. 1;

FIG. 3 is a sectional view taken along the line 3—3 of FIG. 1;

FIG. 4 is an enlarged sectional view taken along the line 4—4 of FIG. 2 and showing a detailed section of the ice freezer elements of a particular sample of the ice freezer pockets and constituent parts thereof;

FIG. 5 is an elongated sectional view taken along the line 5—5 of FIG. 1 and showing a "kicker" embodiment which may be used to assist ice block ejection;

FIG. 6. is a schematic illustration of the refrigeration apparatus of the present invention and showing the reverse cycle feature for rapidly heating, then cooling, the evaporator plate; and FIG. 7 is a schematic illustration of alternate apparatus for removing blocks of ice.

DESCRIPTION OF THE PREFERRED EMBODIMENT

FIG. 1 shows a freezer unit 12 of the present invention and including an ice cube freezing evaporator structure 14, more clearly shown in FIGS. 2–4. Along each side of the evaporator structure 14 is provided a multiplicity of cube ice freezing pockets 16 best shown in FIG. 1.

Vertically spaced and horizontally extending evaporator fins 18 form sides to the pockets 16.

Vertically extending spaced apart movable, plates 20, form the other sides or ends of the freezer pockets 16.

As best shown in FIG. 4, the bottoms or base of the pockets 16 are formed directly by evaporator walls 26. Walls 26 are connected in spaced apart relation to form two flat surfaces as shown. The walls 26, the fins 18, and spacer members 22 as shown are attached together by means of a soldering material 28 such as silver solder, tin or other suitable non-toxic metal alloy.

Referring now to FIG. 1, a chilled water recirculating system including a circulating pump (not shown) is connected through a pipe 34 to a water distribution pipe 36. Pipe 36 has an even distribution of holes along its length which allow passage of an even flow of water down unto a flow distribution plate 38 which evenly carries the flow of water along the top edge of the evaporator structure 14 thereby allowing an even flow of water off the edge of the plate 38 into successive contact with the fins 18 as the water flows from the plate 38 down across the fins 18 into a sump 40.

It is to be noted, with reference to FIG. 4, that the fins 18 may extend outwardly and slightly downwardly from walls 26.

Water from the sump 40 thereon drains through a pipe 42 into the intake of the pump for recirculation. Water which is removed (by its formation into ice) by the evaporator structure 14 is made up from outside the system through a make up pipe (not shown). A float valve (not shown) or similar device provides water through the make up pipe only as needed.

Two rods 46 are disposed along the evaporator structure 14 and are notched to engage each of the movable, vertical plates 20 as shown in FIGS. 1–4. As the rods 46 are moved in different directions, the rods forceably pivot the vertical plates 20 into different angular positions.

Looking now to FIGS. 1, 2, and 4, the rods 46 are connected to transfer bars 50 and 52 which in turn, are connected to springs 62 and 66. An actuator solenoid 60 is mounted through the spring 62 to connect to bar 50. A retraction solenoid 64 is connected through the spring 66 to to connect to bar 52. With the linkage arranged as shown, solenoid 60 is first energized through a switch 61, stretching spring 62, and to some extent spring 66, and thereby urges the plates 20 as shown in FIG. 2 to move in horizontal pivoting motion toward solenoid 60.

However, though being urged to move, the plates 20 do not in fact move until such time as the immediate surfaces of ice blocks in the pockets 16 are sufficiently melted loose to respond to the urging of spring 62 and thereby come loose within the pockets. At this time, the plates 20 do pivot from the positions of FIG. 2 toward solenoid 60 and the ice blocks are thereby partially dislodged within pockets 16.

As soon as plates 20 reach a prescribed position (not shown), a micro-switch (not shown) is actuated to open switch 61 and thereby de-energize activator solenoid 60 and to close a switch 651 and thereby energize the retraction solenoid 64.

Solenoid 64 increases the stretch and consequent urging of tension spring 66 while the spring 62 is released. This action serves to abruptly move or "whip" the plates 20 back through the position shown in FIG. 2 to a position toward solenoid 64. This action forceably ejects the ice from the pockets 16 to be received in a storage bin (not shown) under the freezer unit 12. The solenoid 64 is then released and the freezing cycle is resumed.

The refrigeration apparatus is partially shown in FIGS. 1, 2, and 4 and more completely, though schematically, in FIG. 6. As shown, a liquid refrigerant such as "Freon-12" is stored in an accumulator 68 under pressure. The refrigerant is fed through a liquid line 70 through a expansion control valve 72 to a distributor header 74. From the distributor header 74, the refrigerant is fed into several evaporator channels within walls 26 which are arranged along the walls in parallel arrays by means of the spacers 22 as part of the integral structure shown in FIG. 4. The evaporator feeds into a return suction line 76 which is connected to the suction side of a compressor 78. The refrigerant is compressed by the compressor 78 to a high pressure and temperature and discharged through a discharge line 80 into a water cooled condenser 82 which condenses the hot gas back into a liquid which is drained into accumulator 68 for reuse.

A hot gas bypass line 84 is connected from discharge line 80 through a normally closed solenoid valve 86 and a line 88 into the distributor header 74 as shown, or at an equivalent location.

During a freezing cycle of the freezing evaporator structure 14, the refrigerating apparatus, as shown in FIG. 12, operates normally with the walls 26 freezing ice from the water. At a designated interval 8.5 minutes being an example, the solenoid 86 is actuated by a switch 87, opening the valve and permitting hot gas to go from compressor 78 through line 84 and line 88 directly into the header 74 and the walls 26.

There is little mass to be heated in the freezing evaporator structure 14 as shown in FIGS. 1, 2, and 4. The structure is rapidly heated up by this hot gas to the ice melting point of 32° F. The instant that the immediate surface of ice in pockets 16 comes loose, and the plates 20 are moved to the position shown in FIG. 7 to actuate the micro-switch as previously described, the solenoid of the valve 86 is de-energized, stopping the hot gas circulation and allowing the refrigeration apparatus to resume its freezing mode and function.

In the practice of the method and in the operation of the apparatus as above described, the apparatus 12 is supplied with water and turned on to start the refrigeration apparatus. The water sump 40 is filled with water and recirculated by the circulating pump from the pipe 36 down over the fins 18 as the water 30 shown in FIG. 4. The freezing action of the walls 26 first chill the water in the circulating system and then begins to freeze ice within the pockets 16 as previously described.

The refrigeration apparatus is cycled on a designated time period for (a) a reverse cycle to heat the coils 26 and (b) a freezing cycle to freeze ice in the pockets 16.

An electrical system (not shown) actuates the solenoid 60 and the solenoid of the valve 86 and stops the circulating pump after a prescribed time, 8.5 minutes, for example. The vanes 20 are immediately urged to move the ice blocks within the ice pockets 16. Hot gas is being circulated through the coils 26 to heat the pockets to loosen the ice blocks. The pump is off. After a short period, 0.75 to 1.5 minutes being an example, the ice comes loose within the ice pockets 16, the plates 20 are moved to the prescribed position, and the micro-switch is actuated.

Actuation of the micro-switch energizes the retraction solenoid 64, de-energizes the activator coils solenoid 60, de-energizes the solenoid to valve 86 and starts the pump. The solenoid 64 is de-energized shortly after.

With these actions, the ice is ejected into the storage bin and flow of water over the freezer structure 14 is resumed. The refrigeration apparatus again is freezing and the water 30 is again frozen into ice within the freezer pockets 16 for a succeeding 8.5 minutes. This cycle of making and ejecting ice continues so long as water is supplied and the refrigeration apparatus with its electrical controls continue in operation.

An alternate embodiment of the solenoid system of FIGS. 1 and 2 is shown in FIG. 7. As shown, a cam drive unit 94 is connected through a link 92 to the spring 62. At the outer end of the rods 46 the spring 66 is connected to a fixed support member (not shown) and the solenoid 64 is not used. When actuated, the cam drive 94 places tension on the spring 62 to urge the ice loose as previously described. When the ice comes loose, the previously described micro switch system releases the link 92 in cam drive 94, and releasing the spring 62 from tension. The tension placed in spring 66 by spring 62 then pulls the plates 20 and completely ejects the ice blocks as previously described.

It is to be noted that the water coating on the ice blocks, when the blocks are initially broken loose from the freezer pockets 16, quickly becomes "dry". The ice blocks, after ejection from the freezer pockets 16, become dry because the heat in the water phase is quickly absorbed in the remainder of the ice block.

This feature of having dry ice blocks dropping into the freezer storage compartment differs considerably over previous state of the art apparatus where the ice in the storage bin is usually wet, melting, and fusing together.

It is to be noted that changes and modifications of some substance may be made to the embodiment of the invention as herein illustrated and described, all without departing from the purview and scope of the invention as defined in the appended claims.

We claim:

1. A repetitive method for making discrete blocks of ice comprising:

(a) flowing chilled water over the openings of a plurality of vertically disposed ice freezing pockets which are formed with flat walls of each side of a freezing evaporator as the base of each pocket of said pockets, horizontally extending and vertically spaced apart evaporator fins on said walls as the sides of said each pocket and horizontally movable vertical plates on each of said walls as the ends of said each pocket;

(b) allowing said chilled water coming into contact with said base, said fins, and said plates to freeze and build up ice [to fill] *within* said pockets and form ice blocks [during a designated time period];

(c) applying a force to said vertical plates to urge said plates from a first position toward a second position while concurrently causing said evaporator[,] *and* said fins[, and said plate] to be heated for [a designated] *a* time period *and* to a temperature sufficient to melt free only the immediate surfaces of said ice block [from] *where frozen to* said pockets;

(d) moving said plates from said first position to a second position and thereby moving said ice blocks within said pockets toward removal of said ice blocks from said pockets in response to said force applied to said plate at the instant that said ice blocks are melted free from said pockets; and (e) returning said plate to said first position and thereby completing ejection of said ice blocks from said pockets.

2. The method of claim 1 wherein said ice freezing pockets are disposed along the walls of a flat freezing refrigeration evaporator with said evaporator fins defining a straight edge between said vertical plates.

3. The method of claim 1 further including the steps of receiving and storing said ice blocks in a storage container.

4. An apparatus for repetitively making discrete blocks of ice comprising:

(a) a plurality of vertically disposed ice freezing pockets which are formed with the flat walls of a refrigeration evaporator as the base of each pocket of said pockets, horizontally extending and vertically spaced apart evaporator fins as the sides of said pocket, and horizontally movable vertical plates as the end of said pocket;

(b) refrigeration means for freezing said base and said sides of said pocket;

(c) for circulating chilled water over the openings of said pockets;

(d) means for running said refrigeration means through a freezing cycle sufficient to allow said chilled water coming into contact with said base, said fins and said plates to freeze and build up as ice [to fill] *within* said pockets and form ice blocks;

(e) means for operating said refrigeration means through a heating cycle sufficient to melt only the immediate surfaces of said ice blocks *where frozen to said pockets;*

(f) means to apply force to said vertical plates to urge said plates from a first position horizontally toward a second position until said immediate surfaces are melted from said pockets and thereafter moving said plates from said first position to a second position thereby to move said ice blocks within said pockets responsive to said force when the ice blocks are melted free from said pockets;

(g) means for returning said plates to said first position thereby to completely eject said ice blocks from said pockets; and (h) means for returning said refrigeration means to said freezing cycle.

5. The apparatus of claim 4 wherein said evaporator is flat in shape with said freezing pockets extending along the walls of said evaporator.

6. The apparatus of claim 5 wherein said means for circulating chilled water includes a circulating pipe means for evenly distributing said chilled water along the walls of said evaporator.

7. The apparatus of claim 6 wherein said evaporator is comprises of flat wall connected together through spacer means; wherein said walls, said spacer means and said evaporator fins are joined together as a unit with solder; wherein said means for returning said plates is included with said means to apply force; and wherein said means for operating said refrigeration means through a heating cycle includes solenoid valve means connected to divert compressed hot refrigerant directly into said refrigeration evaporator.

8. The apparatus of claim 4 wherein said evaporator is comprised of flat walls connected together through spacer means.

9. The apparatus of claim 8 wherein said walls, said spacer means and said evaporator fins are joined together as a unit with solder.

10. The apparatus of claim 4 wherein said means to apply force includes means driven by electrical solenoid means.

11. The apparatus of claim 10 wherein said means for returning said plates is included with said means to apply force.

12. The apparatus of claim 4 wherein said means for operating said refrigeration means through a heating cycle includes solenoid valve means connected to divert compressed hot refrigerant directly into said refrigeration evaporator.

13. The apparatus of claim 4 wherein said evaporator is of flat shape with said evaporator fins extending as a straight edge between said vertical plates and with said vertical plates being pivotally mounted in spaced apart relation along said evaporator for pivoted horizontal movement.

14. The apparatus of claim 4 wherein said chilled water is circulated to provide flow over said pockets by means of pump means which draws said chilled water from a sump located under said pockets.

15. The apparatus of claim 4 wherein said refrigeration evaporator is connected into refrigeration means which evaporates [liqui] *liquid* refrigerant in said evaporator for freezing and alternately which circulates hot refrigerant gas through said evaporator for heating.

16. The apparatus of claim 4 wherein each [evsporator] *evaporator* fin of said evaporator fins extends away and slightly downwardly from said evaporator.

17. The apparatus of claim 4 wherein said each vertical plate is pivoted on centers located away from the inner edges of said plates.

18. An article of manufacture suitable for making ice blocks including a vertically disposed plurality of ice freezing pockets with each pocket of said freezing pockets comprising in combination:

(a) a directly refrigeratorable wall member forming the base of each pocket;

(b) at least two vertically disposed apart and horizontally extending fins attached with said plate member and forming the sides of said pocket;

(c) at least two horizontally movable and vertically disposed plates mounted contiguously with said plate member and said extending fins to form the ends of each said pocket of said plurality of pockets; and (d) said plates being pivotably mounted in spaced apart relation for pivoted horizontal movement.

19. The article of claim 18 wherein each fin extends away and slightly downwardly from said evaporator.

20. The article of claim 18 wherein said each vertical plate is pivoted on centers located away from the inner edges of said plate, has a small kicker extension mounted at a right angle with said each plate at the inner edge of said each plate between each pair of said evaporator fins.

21. The article of claim 18 wherein said wall member and said fins are joined together as a unit with solder.

*22. A method for making discrete ice blocks comprising:*

*(a) flowing chilled water over a plurality of surfaces for receiving such chilled water, wherein such surfaces incorporate an evaporator and fins joined as a rigid unit to said evaporator and plates mounted in movable relationship transverse to said fins;*

*(b) freezing the water for building up ice;*

*(c) applying a force to urge said plate surfaces from a first to second position wherein said ice is removed from said surfaces for use; and,*

*(o) allowing said ice to begin to melt to trigger movement of said plates from a first to a second position whereby said blocks are ejected for use as ice.*

*23. A method as set forth in claim 22, including the step of applying heat to said surfaces for further melting of the ice to enable said ice to be removed from said surfaces when said surfaces are moved from a first to second position.*

*24. An apparatus for repetitively making discrete blocks of ice comprising:*

*(a) an evaporator with heat transfer components including a heat transfer wall and projecting fins forming a rigid unit of substantially parallel groves;*

*(b) spaced movable plates mounted transverse to said fins for formation of a plurality of ice freezing pockets;*

*(c) refrigeration means for freezing water in a freezing sequence;*

*(d) means for circulating chilled water over said pockets for freezing said water so that said water can build up as ice in said pockets;*

*(e) force means to urge said plates from a first to a second position; and,*

*(f) cycle controlling means for initiating harvest of ice blocks by melting the immediate surfaces of said blocks adjacent to said heat transfer components to permit movement of said plates from said first to said second position to eject said blocks, and for resetting said plates and said circulating means and said refrigeration means for a next freezing cycle.*

* * * * *